United States Patent [19]

Streck

[11] 3,920,714
[45] Nov. 18, 1975

[54] PROCESS FOR THE PRODUCTION OF POLYMERIC HYDROCARBONS WITH REACTIVE SILYL SIDE GROUPS

[75] Inventor: Roland Streck

[73] Assignees: Heinrich Weber, both of Marl, Germany; Chemische Werke Huels Aktiengesellschaft, Marl, Germany

[22] Filed: Mar. 19, 1974

[21] Appl. No.: 452,663

Related U.S. Application Data

[63] Continuation-in-part of Ser. No. 306,989, Nov. 16, 1972, Pat. No. 3,857,825.

[30] Foreign Application Priority Data

Mar. 23, 1973  Germany.............................. 2314543

[52] U.S. Cl.................. 260/448.2 E; 117/161 R; 117/161 ZA; 161/203; 161/242; 260/4 R; 260/23 R; 260/28.5 R; 260/33.6 UA; 260/41 R; 260/887; 260/889; 260/894; 260/46.5 R; 260/80 PS; 260/88.1 R; 260/93.1; 260/95 R; 260/448.8 R
[51] Int. Cl.$^2$.......................... C07F 7/08; C07F 7/18
[58] Field of Search............ 260/4 R, 23 R, 28.5 R, 260/33.6 UA:41 R, 887, 889, 894, 46.5 R, 80 PS, 88.1 R, 93.1, 95 R, 448.8 R, 448.2 E

[56] References Cited
UNITED STATES PATENTS

| | | | |
|---|---|---|---|
| 2,420,912 | 5/1947 | Hurd................................ | 260/80 PS |
| 2,532,583 | 12/1950 | Tyran............................... | 260/80 PS |
| 2,894,968 | 7/1959 | Webster........................... | 260/80 PS |
| 3,125,554 | 3/1964 | Cooper et al.................... | 260/80 PS |
| 3,322,807 | 5/1967 | Johnson........................... | 260/80 PS |
| 3,631,087 | 12/1971 | Lewis et al...................... | 260/448.2 E |
| 3,694,478 | 9/1972 | Adams et al.................... | 260/448.2 E |

*Primary Examiner*—Paul F. Shaver
*Attorney, Agent, or Firm*—Millen, Raptes & White

[57] ABSTRACT

A process for the production of polymeric hydrocarbons having reactive silyl side groups, characterized in that cycloolefins which can be polymerized under ring opening, and which carry at least one reactive silyl group on the cycloolefin skeleton, are metathetically reacted either by themselves or with other cycloolefins which can be polymerized under ring opening and/or with hydrocarbon polymers having at least one unbranched double bond in the main chain, in the presence of metathetical catalyst.

11 Claims, No Drawings

3,920,714

PROCESS FOR THE PRODUCTION OF POLYMERIC HYDROCARBONS WITH REACTIVE SILYL SIDE GROUPS

CROSS-REFERENCE TO RELATED APPLICATION

This application is a continuation-in-part of copending, commonly assigned U.S. patent application Ser. No. 306,989, filed Nov. 16, 1972 now U.S. Pat. No. 3,857,825, the contents of which are incorporated by reference herein.

BACKGROUND OF THE INVENTION

This invention relates to a process for the production of polymeric hydrocarbons having reactive silyl side groups.

It is well known that cyclic olefins having at least one unsubstituted ring double bond can be polymerized under ring opening with the aid of so-called metathetical catalysts, e.g., see U.S. Pat. Nos. 3,458.489; 3,459,725; 3,476,728; 3,492,245; 3,492,278; 3,502,626 and, inter alia, German Unexamined Laid-Open Applications (DOS) Nos. 1,720,798, 1,770,143 and 1,805,158.

The same catalysts which promote the ring-opening polymerization of cycloolefins are also known to be effective in the olefin metathesis reactions wherein acyclic internal olefins undergo a structural rearrangement, e.g., 2 $R_1$—CH=CH—$R_2$ → $R_1$ CH=CH$R_1$ + $R_2$CH=CH$R_2$ as described, inter alia, by Calderon et al., Tetrahedron Letters 1967: 3327; J. Am. Chem. Soc. 90: 4132 (1968) and in C & E News 45 (41): 51 ff. (1969).

It is also known that open-chain monoolefins, in the presence of the metathetical catalysts, act as molecular weight regulators in the polymerization of cycloolefins, e.g., see DOS No. 1,919,047; DOS No. 1,945,358; DOS No. 2,046,722; DOS No. 2,058,183 and our co-pending U.S. patent application Ser. No. 70,497 filed Sept. 8, 1970. They are also employed as polymer degrading agents on polymers, the main chain of which carries unsubstituted double bonds, e.g., see DOS No. 1,929,140 and U.S. Pat. No. 3,558,589.

Polymers having certain functional groups, e.g., the carboxyl, hydroxyl, amino, isocyanato, mercapto, epoxy or halogen substituents, are of great practical interest since these groups not only impart their own valuable properties to the polymer, e.g., improved adhesion to certain surfaces, improved compatibility with other polymers, increased wettability, reduced surface resistance, increased coloring and imprinting ability, etc., but can also provide starting points for further reactions, such as grafting and cross-linking.

The carboxyl, hydroxyl, amino, isocyanato, mercapto, or epoxy group, as well as halogen atoms, can be introduced into the polymer molecule in a variety of known ways. In part, this is done by the copolymerization of an unsaturated hydrocarbon with a suitable comonomer containing the desired functional group or a suitable precursor thereof. This process, however, is frequently difficult due to the fact that the functional comonomer often inhibits the catalyst utilized for the polymerization of the hydrocarbon. Another method for the introduction of functional groups resides in the subsequent reaction of structurally completed polymers with the formation of functional side groups by addition to existing double bonds or by the substitution of hydrogen atoms of the polymer chain. This process is of more general applicability than the copolymerization technique, but has the disadvantage of requiring an additional process step.

Especially valuable functional substituents are substituted silyl groups of the formula —$SiR_3$, wherein at least one, preferably two or all of the residues R represent a group which can be readily removed by hydrolysis, e.g., halogen, alkoxy, carboxyl, amino, oximino, etc.

The introduction of these reactive silyl groups in polymeric hydrocarbons is of special importance for several reasons. On the one hand, the linking and cross-linking principles known from silicone chemistry can be applied to the thus-modified polymeric hydrocarbons. On the other hand, the affinity of the reactive silyl group to oxide and silicate surfaces, which effects a particularly good adhesion, can thereby be exploited with polymeric hydrocarbons which possess an inexpensive hydrocarbon skeleton structure instead of the expensive polysiloxane skeleton.

It has been suggested to introduce reactive silyl groups into polymeric hydrocarbons by chemically adding silanes which contain, in addition to a silicon-hydrogen bond, a readily hydrolyzable group, e.g., alkoxy or halogen, to several double bonds of the polymeric hydrocarbon. In this reaction, platinum compounds are generally employed as catalysts, e.g., see DOS No. 1,720,527 and DOS No. 1,620,934. The platinum, which is employed in small concentrations as the catalyst, cannot be economically recovered from such processes. Therefore, the platinum losses encountered in the production of large amounts of hydrosilated polymeric hydrocarbons would be economically intolerable.

Purely thermal procedures without any catalyst to effect the hydrosilation of an unsaturated rubbery polymer are likewise conventional, e.g., see U.S. Pat. Nos. 2,557,778 and 2,475,122. However, the required high reaction temperatures, e.g., of about 300°C, apparently cause severe degradation of the polymers, since the hydrosilation products are always described as liquids. Such products are unsuitable for general applications but rather are useful only for special purposes.

Another technique for the introduction of reactive silyl groups of an unsaturated polymer is illustrated by U.S. Pat. No. 3,440,302. This process involves the free radical addition of a terminal alkyl sulfhydryl group to a partially alkylated silane containing readily hydrolyzable groups. α-mercaptopropyltrimethoxysilane is mentioned as a preferred silane, but this compound is presently too expensive a silicon derivative to permit widespread technical scale application of this process.

It is furthermore known to copolymerize ethylene and propylene with norbornenyl silanes by means of vanadium-containing Ziegler-Natta catalysts, e.g., see DAS No. 1,570,526, to produce a copolymer which is curable by the addition of water. This method is generally applicable to polyolefin rubbers and is likewise unsuitable for the subsequent modification of finished polymers.

Our above-mentioned copending U.S. patent application describes a process for preparing polymeric hydrocarbons with reactive silyl end groups. Briefly, according to that invention, polymers having reactive silyl end groups are produced by reacting, in the presence of a metathetical catalyst, (a) a cycloolefin of 4, 5 or 7 or more ring carbon atoms having at least one non-conjugated unsubstituted double bond in the ring and/or (b)

a polymeric hydrocarbon having at least one non-conjugated unsubstituted double bond, with (c) an organic silicon compound having at least one organic group bound to the silicon atom by a carbon-silicon bond and which contains at least one unsubstituted, non-conjugated acyclic double bond, i.e., a double bond which is not part of a ring system, and having at least one silicon atom bearing, via a carbon-silicon bond, at least one substituent which is readily removable by hydrolysis.

This process is of particular advantage in enabling the attachment of silyl end groups in a controlled manner, i.e., either during the polymerization of cycloolefins, or during the degradation of hydrocarbon polymers unsaturated in the main chain with at least one unbranched double bond, e.g., cis-1,4-polybutadiene, polypentenamer, polyoctenamer, polydecenamer, polydodecenamer, piperylene butyl rubber, etc. As compared to the catalytic hydrosilation of unsaturated polymers, the process has the advantage that no valuable noble metal catalysts are lost during the course of the reaction; when required, such catalysts are employed only during the production of the mono- and bis-silyl olefin starting materials, where the catalysts can be readily regenerated. However, due to the extreme terminal selectivity of the reaction, the number of silyl groups which can be attached is limited to a maximum of two for each unbranched molecule.

There are still many instances in which it would be desirable to introduce a greater number of reactive silyl groups per molecule of polymeric hydrocarbons in order to further improve the property spectrum of these substances and thereby broaden their field of application.

OBJECTS OF THE INVENTION

Accordingly, it is a general object of the present invention to provide a process for introducing reactive silyl groups into a hydrocarbon polymer skeleton.

Another object of the present invention is to provide a process for preparing polymers having a hydrocarbon skeleton and silyl side groups substituted thereon.

A further object of the invention is to provide a process for substituting the non-terminal double bonds in a polymer skeleton with reactive silyl side groups.

Upon further study of the specification and appended claims, further objects and advantages of this invention will become apparent to those skilled in the art.

SUMMARY OF THE INVENTION

Briefly, the above and other objects are attained in one aspect of the present invention by providing a process for the production of polymeric hydrocarbons having reactive silyl side groups, characterized in that cycloolefins which can be polymerized under ring opening, and which carry at least one reactive silyl group on the cycloolefin skeleton, are metathetically reacted either by themselves or with other cycloolefins which can be polymerized under ring opening and/or with hydrocarbon polymers having at least one unbranched double bond in the main chain, in the presence of metathetical catalyst.

DETAILED DISCUSSION

The present invention provides a process for preparing polymers having reactive silyl side groups, i.e., which are non-terminally located along the polymer backbone. The silyl content of a given polymer can thus be greatly increased over that possible with our earlier process, which is limited to terminal substitutions, e.g., of only two possible silyl end groups in a strictly linear polymer. The advantages of the present process will be readily apparent to those skilled in the art.

The metathesis reaction employed in the process of the present application is effected between a non-conjugated, unsubstituted double bond in the hydrocarbon reactant and a similar and acyclic double bond in the organosilicon reactant. According to the present invention, it has now been found that a metathesis reaction can be effected between similar hydrocarbon reactants and a cycloolefin polymerizable under ring opening which bears at least one reactive silyl group on a ring carbon atom at a position other than the carbon atoms forming the double bond therein, preferably adjacent to such carbon atom or atoms.

Suitable silyl groups on the above parent ring compounds are those of the formula $SiR_1R_2R_3$ wherein at least one, preferably two and especially all three of $R_1$, $R_2$ and $R_3$ are each hydrolyzable halogen, especially chlorine; alkoxy of 1–4 carbon atoms; alkanoyloxy of 1–8 carbon atoms, e.g., carboxy; carboxylic aroyloxy of 6–12 carbon atoms; or ketoxime, especially di-lower alkyl ketoxime; and the remainder, if any, of $R_1$, $R_2$ and $R_3$ being preferably hydrogen, lower alkyl of 1–4 carbon atoms or lower alkylene of 2–20 carbon atoms.

It is essential that the silyl cycloolefin to be suitable for use in the present process having at least one unsubstituted, non-conjugated double bond in the cycloolefin skeleton.

Silyl cycloolefins preferred in the process of this invention generally contain 4 to 12 ring carbon atoms and a total of 4 to 20, preferably 4 to 15 carbon atoms; from 1 to 3, preferably 1 to 2 rings, which can be fused or separate cycloaliphatic rings; whose non-silylated ring carbon atoms are unsubstituted or one or more of which are substituted with lower-alkyl, e.g., of 1 to 4 carbon atoms, cycloalkyl, e.g., of 5 to 7 carbon atoms, or aryl, alkaryl or aralkyl, e.g., of 6 to 10 carbon atoms.

Preferred classes of starting silyl cycloolefins are the silylated compounds obtained from the following parent ring compounds:
a. those containing 1 to 3 non-conjugated double bonds, preferably one;
b. those containing 1 to 2 rings, preferably one;
c. those of (a) and (b), containing two fused rings;
d. those of (a), (b) and (c) containing 0-2 lower-alkyl groups as the sole substituents on the non-silylated ring carbon atoms, preferably 0;
e. those of (d) containing 1–2 methyl groups as the sole substituents on the non-silylated ring carbon atoms;
f. those of (a), (b), (c), (d) and (e) wherein the unsaturated carbon atoms each bear a hydrogen atom; and
g. those of (a), (b), (c), (d), (e) and (f) wherein the ring of the cycloolefin containing the unsaturation contains 5 or 7 to 12 ring carbon atoms.

Suitable cycloolefins substituted by reactive silyl groups are well known in the art and include but are not limited to 3-(β-trichlorosilylethyl)-cyclooctene-(1); 5-(dichloromethylsilyl)-norbornene; 3-dibutylethoxysilyl-cyclopentene-(1); 1-dimethylbromosilyl-cyclododecadiene-(4,8); 5,9-bis (trichlorosilyl)-cyclododecene-(1); 3-(α-methylethoxyiodosilyl)-propyl-cycloheptene-(1); 1-methyl-3-tributoxysilyl-cyclooctadiene-(1,5); 5-triacetoxysilylcyclooctene- (1); 1-(octadecyldifluorosilyl)-cyclohexadecatetraene-(1,5,9,13); 4-(cyclopropylmonochlorosilyl)-cyclopentene-(1); 6-(phenyl-n-octyl-chlorosilyl)-cyclotetracosadiene-(1,13); 1-(4-cyclononene-[5]-yl-methylethylsilyl)-4-trichlorosilylbenzene; etc.

In the process of this invention, those silylcycloolefins which contain more than one unsaturated ring system and which can be polymerized under ring opening can also be utilized. Such silylcycloolefin are likewise well known in the art and include but are not limited to di-(cycloocten-[1]-yl-4)-dichlorosilane; 1-tribromosilylnorbornadiene; 5-triethoxysilyl-4,4'-dicycloundecenyl; etc. Such silylcycloolefins then produce additional branching and/or cross-linking. Furthermore suitable are those silylcycloolefins which also possess, in addition to one or more unsaturated ring systems which can be polymerized under ring opening, one or more straight-chain or branched unconjugated double bonds in an open chain, e.g., 3-allyl-5-methyldichlorosilyl-cyclooctene-(1) or vinylcyclodecen-5-yl-dimethoxysilane. Such silylcycloolefins then have the additional effect of a molecular weight controlling agent due to the unconjugated double bond therein.

Preferred silylcycloolefins are those which possess both an unsaturated ring system which can be polymerized under ring opening and a reactive silyl group with substituents that can readily be removed by hydrolysis. Especially preferred are those organic silicon compounds wherein the substituents readily removable by hydrolysis are halogen atoms, preferably chlorine atoms. Organic silicon compounds with other substituents readily removable by hydrolysis, e.g., alkoxy, carboxyl or ketoxime groups can also be used if the donor functions of the aforementioned substituents are compensated for by adding a Lewis acid, preferably alkyl aluminum, alkyl aluminum halide, or aluminum halide; otherwise the catalyst is inhibited. It is not always necessary to compensate each substituent having a donor function by one mole of a Lewis acid; for example, when using trialkoxysilanes or dialkoxysilanes, it is sufficient to use 1 mole of a Lewis acid per mole of silane. Those skilled in the art can readily determine the required amount of Lewis acid in a given case by a simple series of experiments, e.g., see Example 7 set forth below.

The silylcycloolefins suitable for use in the process of this invention are readily obtainable in various ways according to known art methods, e.g., by the hydrosilation of cyclopolyolefins and/or alkenylcycloolefins, by Diels-Alder reactions of cyclopentadiene with alkenylsilanes, or by Grignard syntheses. In place of the aforementioned silylcycloolefins, silylpolyalkenamers, i.e., polymers or copolymers thereof obtainable by the ring-opening polymerization with metathesis catalysts, can also be used successfully in the process of this invention.

Suitable cyclic olefins or cycloolefins useful in the present invention are unsaturated hydrocarbons having one or more rings and which have in at least one ring at least one unsubstituted unconjugated double bond.

Examples of cyclic olefins and polyalkenamers which can be employed in the process of this invention are monocyclic monoolefins of the formula

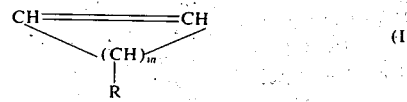
(I)

and the linear unsaturated polyalkenamers obtained by the ring-opening homopolymerization thereof of the formula

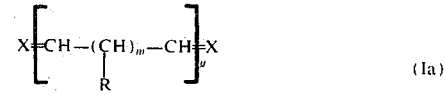
(Ia)

wherein X is a straight-chain or branched alkylidene group of 1 to 20 carbon atoms which may be substituted by cycloaliphatic and/or aromatic residues and/or by alkoxy and/or carbalkoxy groups and/or halogen atoms, R is hydrogen or a straight-chain, branched or cycloaliphatic saturated alkyl residue of 1 to 6 carbon atoms, or an aryl group of 6 to 10 carbon atoms; $m$ is 2, 3 or an integer from 5 to 10 inclusive; and $y$ is an integer from 2 to about 50,000, preferably 5 to about 20,000.

The

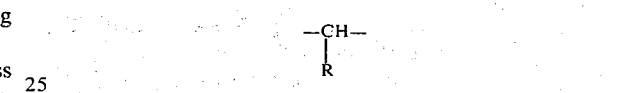

groups can be alike or different, i.e., R can represent a hydrogen atom in every instance in the molecule or 1 to $m$ of the R groups can be an alkyl or an aryl group. Thus, by the ring-opening homopolymerization of unsubstituted monocyclic monoolefins, i.e., compounds of Formula I wherein R is hydrogen, there are obtained polymers of the formula:

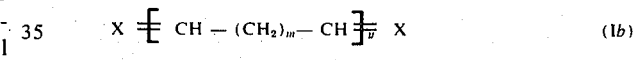
(Ib)

wherein X, $y$ and $m$ have the values given above.

Also suitable as starting cyclic olefins and polyalkenamers are monocyclic diolefins of the formula:

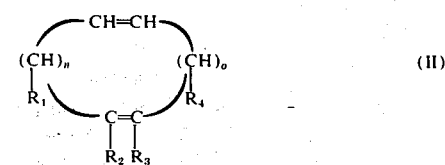
(II)

and the linear unsaturated polyalkenamers obtained by the ring-opening homopolymerization of the formula:

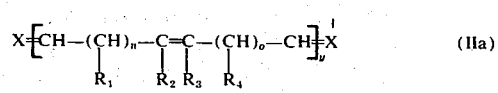
(IIa)

wherein, in Formulae II and IIa, X and Y have the values given above, and $R_1$, $R_2$, $R_3$ and $R_4$, which can be alike or different, each have the same values as R in Formulae I and Ia and each of $n$ and $o$ are integers from 1–11, their sum being 3–12. All $n$ of the $R_1$ groups and/or all of the $R_4$ groups can be hydrogen or from 1 to $n$ of the $R_2$ groups and/or 1 to $o$ of the $R_3$ groups can, respectively, be an alkyl or aryl group. Thus, polymers of the formula:

(IIb)

are obtained by the ring-opening homopolymerization of unsubstituted monocyclic diolefins of Formula II when X, y, n and o have the values given above and $R_1$, $R_2$, $R_3$ and $R_4$ are hydrogen atoms.

Also suitable starting materials are monocyclic triolefins of the formula:

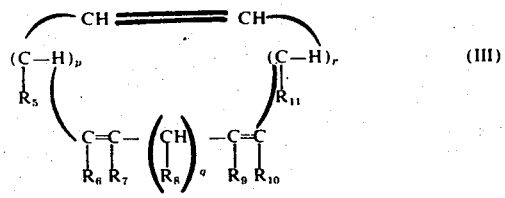

(III)

and the polyalkenamers obtained by the ring-opening polymerization thereof of the formula:

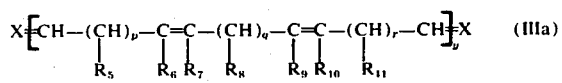

(IIIa)

wherein X and y have the values given above and $R_5$, $R_6$, $R_7$, $R_8$, $R_9$, $R_{10}$ and $R_{11}$ in the Formulae III and IIIa each have the same values as R. The various $R_5$, $R_8$ and $R_{11}$ groups can be identical or different groups, i.e., all p of the $R_5$ groups, all q of the $R_8$ groups and/or all r of the $R_{11}$ groups can be hydrogen, or from 1 to p of the $R_5$ groups, 1 to q of the $R_{12}$ groups and/or 1 to r of the $R_{11}$ groups can, respectively, be an alkyl or aryl group. The same is true of the $R_6$, $R_7$, $R_9$ and $R_{10}$ groups, which likewise can all represent hydrogen, or individually or severally can be identical or different alkyl or aryl groups.

Also suitable as starting materials are norbornene and the polymers obtained thereof of the formula:

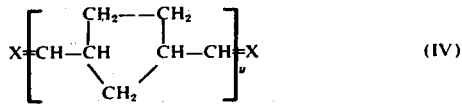

(IV)

In Formulae II, IIa, IIb, IIIa and IV, n and o each are integers from 1 to 11, the sum of which is an integer from 3 to 12; and p, q and r each are the integers 1 or 2.

Also suitable are polymers containing two or more of the above-disclosed polymer units in statistical distribution or in larger block sequences produced by the ring-opening copolymerization of two or more of the above described cycloolefins.

Such suitable cyclic olefins or cycloolefins are well known in the art and include but are not limited to cyclobutene; cyclopentene; cycloheptene; cis- and trans-cyclooctene; cyclononene; cyclodecene; cycloundecene; cis- and trans-cyclododecene; cis,cis-cyclooctadiene-(1,5); 1-methylcyclooctadiene-(1,5); 3-methylcyclooctadiene-(1,5); 3,7-dimethylcyclooctadiene-(1,5); cis,trans,trans-cyclododecatriene-(1,5,9); trans,trans,-trans-cyclododecatriene-(1,5,9); 4,5-dimethylcyclodecatriene-(1,4,7); 3-chlorocyclooctene; cyclododecadiene-(1,5); norbornene; norbornadiene; dicyclopentadiene; dihydrodicyclopentadiene; Diels-Alder adducts of hexachlorocyclopentadiene to norbornadiene ("Aldrin") or to cis,cis-cyclooctadiene-(1,5); cyclohexadecadiene-(1,9); etc. as well as higher macrocycles, e.g., those obtainable according to DOS No. 2,103,369 from butadiene. Cyclohexene and the monomer derivatives thereof are excepted, since they cannot be polymerized under ring opening.

In place of the aforementioned cycloolefins and/or together therewith, one can likewise use their corresponding open-chain or cyclic polymers (the so-called polyalkenamers) for the process of this invention, even though the polymers were not obtained by the ring-opening polymerization of cycloolefins. For Example, not only the polybutenamer obtained by cyclobutene, cis,cis-cyclooctadiene-(1,5) and cyclododecatriene-(1,5,9) is suitable, but also the structurally virtually identical product obtained directly from butadiene in the presence of cobalt- or iodine- and titanium-containing Ziegler-Natta catalysts. Likewise suitable is the polyhexenamer indirectly obtainable from ethylene and butadiene according to the process of U.S. Pat. No. 3,407,185 although its hypothetical parent substance cyclohexene cannot be polymerized under ring opening. The same holds true for copolymers containing alkenamer units, e.g., copolymers of 1,4-butadiene or piperylene with styrene, isoprene, isobutylene, ethylene, propylene, etc. Further suitable substrates for the attachment of reactive silyl side groups thereto are also copolyalkenamers obtained, e.g., by the copolymerization of various cycloolefins according to the process of U.S. Pat. No. 3,502,626 or DOS No. 1,961,865, or by subsequent metathetical reaction of polyalkenamers according to the process of DOS No. 2,058,198. Other suitable starting substances for the process of this invention are those polyalkenamers or copolyalkenamers wherein a portion of the double bonds has been saturated by hydrogenation and/or addition of halogens, halo carbenes, hexachlorocyclopentadiene or other modifiers, provided that the substituted groups do not have an inhibitory effect on the catalyst.

The silylcycloolefins can either be homopolymerized or they can be components of copolymers further containing up to 99.9 mol percent of unsilylated cycloolefins, based on the monomer mixture. When using unsaturated polymers, each chain segment between two unbranched double bonds is considered a monomer unit for purposes of calculating the mole ratio. The proportion of the silylcycloolefin added to the reaction mixture is selected as a function of the amount of silyl groups desired in the resultant polymer of this invention, depending on the ultimate intended use. For example, if merely an improved adhesion of the polymers to silicate or other (hydr)-oxide surfaces is desired, 0.5 - 5 mole percent of silylcycloolefin is generally sufficient. In order to increase the cross-linking density of rubber-elastic masses, higher amounts, e.g., up to 20 mole percent will generally be used; for the production of curable resins, an even greater amount of silylcycloolefin will generally be employed, e.g., 20–100 mol percent. The amounts optimal for particular application can be easily determined by a few routine experiments. During the metathesis reaction, any donor functions of the substituents which can readily be removed by hydrolysis must be sufficiently compensated for by Lewis acids, as discussed above. The particular point at which the organic silicon compound is added is uncritical, since this can take place at any time before the inactivation of the catalyst, i.e., prior to, during, or after the ring-opening polymerization of cycloolefins. Similarly, regarding the reaction with polymeric hydrocarbons, the organic silicon compound can be provided either with the catalyst or with a solution of the polymeric hydrocarbon, or it can be added to a mixture of catalyst and polymeric hydrocarbon solution. Furthermore, the organic silicon compound can be added dropwise to the catalyst, after having been mixed with the solution of the polymeric hydrocarbon.

The production of polyalkenamers with reactive silyl groups in the lateral position can be accomplished in various ways. It is possible, for example, to polymerize the cycloolefin in admixture with silylcycloolefin, i.e., to conduct a normal copolymerization. However, it is also possible to first polymerize one of the two components and/or provide such component in the polymerized condition, and then to add the second component in the presence of the metathetical catalyst, either as the monomer or as the polymer. It is likewise possible to react unsaturated polymers produced in some other manner and having unbranched double bonds in the main chain — such as, for example, cis-1,4-polybutadiene, piperylene-butyl rubber, styrene-butadiene copolymers, ethylene-propylene-butadiene terpolymers — in the presence of the metathetical catalyst with the silylcycloolefin or the polymer and/or copolymer thereof. It is, of course, possible during the reaction to operate with the addition of a molecular weight controller, e.g., an optionally substituted, preferably silyl-substituted open-chain olefin, or a cross-linking agent, e.g., a bicyclic diolefin of the type of norbornadiene; tricyclo[8,2,1,0$^{2,9}$]-tridecadiene-(5,11); dicyclooctenyl, etc., in order to affect the molecular weight and the degree of branching of the polymers of this invention in the desired manner.

Also, the copolymerization of cycloolefin mixtures with silylcycloolefins with the simultaneous use of silylolefins as the controllers is within the scope of the present process. For example, during the polymerization of a mixture of cyclododecene, cyclododecadienes and cyclododecatriene stemming from the incomplete hydrogenation of cyclododecatriene-(1,5,9), a mixture of 1,10-bis(methyldichlorosilyl)decene-(4) and 1-trichlorosilyl-cyclododecadiene-(4,8) can advantageously be employed as the means for the simultaneous attachment of terminal- and side-positioned silyl groups.

As is known, metathetical catalysts are mixed catalysts containing compounds of metals of secondary groups V to VII of the periodic table, predominantly of niobium, tantalum, molybdenum, tungsten and rhenium, as well as metals of main groups I–III or of secondary group IV(Sn,Pb) of the periodic table, and/or the alkyl compounds or hydrides thereof, optionally with further ligands, e.g., halide, alkoxy, etc. or, in their place, Lewis acids. Furthermore, the metathetical catalysts can contain additional known activating additives, e.g., alcohols, epoxides, tert.-butyl hypochlorite, peroxides, carboxylic acids, aromatic nitro compounds, vinyl halides, vinyl and allyl ethers, vinyl and allyl esters, etc.

When conducting the process of this invention, it is to be noted that conjugated diolefins, such as butadiene, have a very disadvantageous effect on the catalyst. For this reason, they must be most extensively removed, e.g., by a vacuum degasification — unless for example a finished, monomer-free, rubbery homo- or copolymer is dissolved in a separate operation, rather than advantageously employing directly a solution stemming from the production, for the preparation of a polybutenamer substituted by reactive silyl side groups. Alkynes, e.g., acetylene, 1-butyne, 2-butyne or phenylacetylene are also strong catalyst poisons and therefore must also be removed most thoroughly, as is known in the art.

The reaction can be conducted in those solvents known to be suitable for polymerization with Ziegler-Natta catalysts. Suitable such aliphatic, alicyclic, aromatic, and halogenated hydrocarbons are well known in the art and include but are not limited to pentane, hexane, heptane, n- and isooctane, isononane (hydrogenated propene trimer), n-decane, isododecane (hydrogenated propene tetramer), cyclopentane, cyclohexane, methylcyclopentane, methylcyclohexane, ethylcyclohexane, isopropylcyclohexane, cyclooctane, decahydronaphthalene, hydrogenated terpenes such as pinane and camphane, cyclohexane and the substitution products thereof, benzene, toluene, o-, m-, p-xylene, ethylbenzene, o-, m-, p-diethylbenzene, n-propylbenzene, isopropylbenzene and other mono- to polyalkylbenzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene, 1,2-dichloroethane, etc.

As is known, it is essential that the solvents are utilized maximally free of water and other H-acidic compounds, as well as of compounds having electron donor functions (Lewis bases). Except for very small quantities which are added in certain cases for attaining certain effects, such impurities generally impair the activity of the catalyst.

The process of this invention is generally conducted at temperatures of between $-50°$ and $+80°C$. The reaction temperature is limited in the upward direction by the thermal stability of the catalyst and in the downward direction by an excessively reduced reaction velocity. The process is advantageously carried out at temperatures of between $-30°$ and $+50°C$, preferably between $0°$ and $+30°$ C.

The polymeric hydrocarbons with reactive silyl side groups produced according to the process of this invention are either thinly fluid to highly viscous liquids, salve-type to wax-like masses, or elastomeric or thermoplastic products, depending on the molecular weight, the basic monomer building blocks, and the microstructure.

The polymeric hydrocarbons prepared according to the process of the present invention can be worked up in a conventional manner, the aforementioned differences in consistency and the future use determining the particular process to be recommended in each particular case. No basically novel methods are required in this connection. For example, a polymeric liquid, after the inactivation of the catalyst, will merely be freed of solvents and other volatile components, such as residual monomer and any lower oligomers present, by means of distillation, e.g., on a rotary or thin-film evaporator, whereas the solution of an elastomer will more advantageously be worked up by means of precipitation, e.g., with a lower alcohol such as methanol, ethanol or isopropanol, It is, of course, to be kept in mind that any halosilyl groups which may be present will be converted into alkoxysilyl groups. However, this conversion may be desirable or even necessary in order to avoid the evolution of hydrogen halide during subsequent curing.

In case of a thermoplastic polymer obtained during the course of polymerization in a pulverulent or grainy form, e.g., a polydodecenamer containing silyl groups produced in a hexane or pentane solvent, the working-up step can comprise simple vacuum-filtering or centrifuging of the solvent, optionally supplemented by a subsequent washing step.

In all working-up methods, consideration must be given to the water sensitivity of the reactive silyl groups, in order to avoid premature unintended cross-linking reactions.

The great variety of different possible consistencies, together with a variable functionality of the reactive silyl groups, makes it possible to utilize the polymers of the present invention in a large variety of applications, e.g., as adhesion promoters for rubbers on silicate surfaces such as glass fibers in place of the heretofore customary substances γ-mercaptopropyltriethoxysilane or γ-aminopropyltriethoxysilane, or as modifiers for silicone rubbers, silicone oils, and silicone resins.

In order to modify the physical properties, a great number of different additives can be incorporated into the polymers of this invention. For example, in order to improve the tensile strength at rupture, they can be filled with carbon blacks. Other additives for elastomers can also be incorporated, e.g., talc, silicic acid, titanium dioxide and colored pigments. Customary stabilizers can be added in order to improve the light and oxidation stability as well as agents which render the product flame-retardant.

With a sufficiently high content of reactive silyl groups in the polymers, the amount of cross-linking effected by condensation of the silanol groups produced after the hydrolysis is of itself generally sufficient to obtain a polymer network of usable strength. In order to promote this reaction, the halosilyl groups can be converted, for example, into acetoxysilyl groups according to known principles of silicone chemistry; in this case, polymers are obtained which are spontaneously cross-linked by moisture. Alternatively, the product is hydrolyzed to a polymer containing silanol groups, and customary cross-linking catalysts for silicones are added — such as dibutyltin dilaurate, tin(II) octoate, alcoholates, carboxylates, or chelates of titanium, zirconium, or lead, and furthermore amines, alkali hydroxides, alkali silanolates, or alkali siloxanates, etc. — and optionally also auxiliary cross-linking agents such as tetraethyl silicate, ethyl polysilicate, methyltrimethoxysilane, triethoxysilane, etc. In this case, a substance is obtained which vulcanizes at room temperature.

However, it is also possible to subject the polymeric hydrocarbons of this invention to the cross-linking reactions known from the chemistry of elastomeric hydrocarbons, e.g., the vulcanization with sulfur or with peroxides. This step is advantageous if the condensation of the silanol groups by itself does not yet result in a sufficient cross-linking density, i.e., in case of low contents of reactive silyl groups which, however, are sufficient for obtaining certain effects such as improved adhesion.

It will be apparent to those skilled in the art that the polymers produced according to the process of this invention can be utilized not only by themselves but also in a mixture with other compatible polymers. Included in this group are, for example, natural rubber, synthetic polyisoprene, cis-1,4-polybutadiene, 1,2-polybutadiene, copolymers of butadiene with isoprene, styrene, ethylene, butene-1, piperylene, and other mono- and diolefins, as well as EPDM and butyl rubber, polypentenamer, polyoctenamer and polydodecenamer. Of course, it is likewise possible to cross-link various polymers with reactive silyl groups produced according to the process of this invention with another, e.g., a polybutenamer containing trimethoxysilyl side groups with a polydodecenamer containing methyldiethoxysilyl side groups, wherein the degrees of polymerization can also be different. Such a blended combination with the polymers with reactive silyl end groups produced according to our referenced U.S. patent application is possible, for example by the common cross-linking of a polypentenamer terminated bilaterally by dimethylmonomethoxysilyl with a polyoctenamer which, by the copolymerization of cyclooctene with 5-methyldichlorosilyl norbornene, carries on the average one bifunctional silyl side group per about 200 chain carbon atoms.

The process of this invention will be explained by means of the following examples which, though typical, should not be considered to be limiting. Unless otherwise indicated, the reduced specific viscosity (RSV) values were determined in toluene at 25°C. Cross-linking tests were conducted by the method described in Example 1.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight. The values obtained in elemental analyses are within commonly accepted limits of error.

EXAMPLE 1

Copolymerization of cyclopentene with 5-trichlorosilyl norbornene, produced by Diels-Alder reaction of cyclopentadiene with vinyl trichlorosilane according to G. H. Wagner et al., Ind. Eng. Chem. 45: 367 (1963).

Under an argon atmosphere, 150 ml. of dry hexane and 10 ml. of cyclopentene were charged into a three-necked flask having a capacity of 500 ml. and equipped with a dropping funnel, an agitator, and a protective gas feed line. To this mixture at 0°C under agitation were added 0.5 mmol. of tungsten hexachloride, 0.5 mmol. of ethanol, 3.5 mmol. of ethylaluminum dichloride and 0.5 mmol. of allyl-2,4,6-tribromophenyl ether. After 2 minutes, a mixture of 90 ml. of cyclopentene, 25.9 g of 5-trichlorosilyl norbornene (10 mole percent) and 6.4 g of 1-octene (5 mole percent) was added dropwise to the thus-formed catalyst. The charge was agitated at 0°C for 2.5 hours; the catalyst was then destroyed by adding 10 ml. of methanol. The mixture was gradually introduced under stirring into a 1-liter flask filled with 500 ml. of methanol, in order to precipitate the polymer; at the same time, alcoholysis of the trichlorosilyl groups to trimethoxysilyl groups took place. The methanol, colored blue by catalyst residues, was twice replaced by 250 ml. of fresh methanol, and the viscous polymer phase was dried under vacuum at about 30°–40°C.

This procedure yielded 88.2 of a viscous, almost colorless polymer which, according to its elemental analysis, contained 3.7% of silicon and had a molecular weight (number average) of 2080±5%, determined by vapor pressure osmosis.

Two grams of this polymer was dissolved in 40 ml. of hexane, mixed with 20 mg. of dibutyltin dilaurate, and poured onto water-filled dishes having a surface of 600 cm². After 24 hours, the thus-produced elastic polymer film was removed, freed of any adhering water by means of methanol, and dried in a desiccator under reduced pressure. The solubility of this film in toluene at 25°C was only 6%, i.e. 94% of the polymer had been cross-linked in this experiment.

This example proves that the organosilicon compound is indeed incorporated into the polymer and imparts to the latter reactive groups which, in the presence of water, as well as cross-linking catalysts customary in silicone chemistry, result in cross-linking.

EXAMPLE 2

Homopolymerization of 5-methyldichlorosilyl norbornene, produced by Diels-Alder reaction of cyclopentadiene with methylvinyldichlorosilane according to a publication by H. Kuivila, J. Org. Chem. 29: 2845 (1964).

In order to polymerize the substance, 100 ml. of hexane was provided in an agitated flask and mixed with respectively 0.5 millimole each of tungsten hexachloride and ethanol, as well as with 3 millimoles of ethylaluminum dichloride, whereupon a mixture was added dropwise consisting of 103.5 g (0.5 mole) of 5-methyldichlorosilyl norbornene and 5.6 g (10 mole percent) of 1-octene. After a reaction time of 5 hours at room temperature, the polymerization was interrupted by the addition of 10 ml. of methanol. The reaction mixture was gently subjected to alcoholysis by stirring 250 ml. of methanol into the mixture, and precipitated, thus obtaining a tacky polymer. After another washing step with 100 ml. of methanol, the polymer was dried under vacuum at 30°–40° C. The yield was 32.3 g. In a cross-linking test as described in Example 1, the polymer became 100 % insoluble in toluene within 2 hours.

EXAMPLE 3

Copolymerization of cyclopentene with cis,cis-cyclooctadiene-(1,5) and 5-(trichlorosilylethyl)-norbornene produced by the chemical addition of trichlorosilane to 5-vinyl norbornene in the presence of hexachloroplatinic acid.

In the same manner as in Example 1, 12.5 g (5 mole percent) of the distilled addition product was copolymerized with 50 ml. = 38.8 g of cyclopentene and 50 ml. = 43.9 g of cis,cis-cyclooctadiene-(1,5); 0.84 g = 1 mole percent of vinyl acetate served as the molecular weight controlling agent. The catalyst consisted of 0.5 mmol. of tungsten hexachloride, 0.5 mmol. of ethanol and 12.8 mmol. of ethylaluminum dichloride. The polymerization was conducted at 20°C for 2.5 hours.

83.6 g of an elastomer was thus obtained, containing 1,4% of silicon. According to a cross-linking test as described in Example 1 at room temperature, 89 % of this product had become insoluble in toluene at 25° C.

EXAMPLE 4

Copolymerization of cyclooctene with 5-(trichlorosilylethyl)-norbornene and control by means of 1,10-bis(methyldichlorosilyl) decene-(4).

With the use of 0.5 mmol. of tungsten hexachloride, 0.5 mmol. of ethanol and 3 mmol. of ethylaluminum dichloride, the copolymerization of 100 ml. = 84 g of cyclooctene with 5.84 g (3 mole percent) of 5-(trichlorosilylethyl)-norbornene was conducted, wherein 2.76 g = 1 mole percent of 1,10-bis (methyldichlorosilyl) decene-(4) served as the molecular weight controlling agent. Due to the viscosity of the reaction mixture, the initial 100 ml. of hexane had to be supplemented by another 200 ml. The reaction time was, as in Example 1, 2.5 hours, but at 20° C.

After the working-up step, as described above, 72.2 g of an elastomer was obtained which contained 0.7% of silicon. This product, with an RSV of 0.55 dl/g, was 82% soluble in toluene at 25°C before the cross-linking test as described in Example 1, and thereafter only 21 % soluble.

It can be seen from this example that even relatively minor amounts of silicon-containing comonomers are sufficient to attain a high degree of cross-linking, if silicon-containing end groups are simultaneously introduced by the molecular weight controlling agent.

EXAMPLE 5

Modification of cis-1,4-polybutadiene by means of 5-(trichlorosilylethyl)-norbornene.

54 g of technical cis-1,4-polybutadiene ("BUNA" CB 10) was dissolved in 540 ml. of perchloroethylene and mixed with 51.0 g (20 mole percent) of 5-(trichlorosilylethyl)-norbornene. After adding a catalyst (produced separately from 0.5 mmol. of tungsten hexachloride, 0.5 mmol. of ethanol and 3 mmol. of ethylaluminum dichloride), the mixture was reacted at 20°C for 20 minutes, and then worked up by means of three times 200 ml. of methanol and evaporation of the polymer phase on a rotary evaporator, yielding 70.5 g of a viscous product having the following analytical data: RSV = 0.23 dl/g, 5% gel, 4.8% silicon, 15% trans-double bonds, 77% cis-double bonds, 8% vinyl groups. In a cross-linking test as described in Example 79 % of toluene-insoluble matter was obtained.

This example demonstrates that finished polymers can be modified by the process of the present invention.

EXAMPLE 6

Modification of cis-1,4-polybutadiene by means of 1-trichlorosilyl-cyclododecadiene-(4,8), produced according to H. Takahasi et al, J. Org. Chem. 28: 3353–3356 (1963) by the chemical addition of trichlorosilane to cis,trans,trans-cyclododecatriene-(1,5,9).

In place of the 5-(trichlorosilylethyl)-norbornene utilized in Example 4, 59.4 g (20 mole percent) of 1-trichlorosilyl-cyclododecadiene-(4,8) was utilized for the modification of 54 g of cis-1,4-polybutadiene. The product was 116.8 g of a viscous polymer having an RSV of 0.29 dl/g and a silicon content of 2.4%. In a cross-linking test as described in Example 33 % became insoluble in toluene with 24 hours.

EXAMPLES 7–15

Copolymerization of 5-trimethoxysilyl norbornene with cyclopentene.

Analogously to the above examples, respectively 100 ml. = 77.8 g of cyclopentene was copolymerized with 10 mmol. = 2.44 g of 5-trimethoxysilyl norbornene in 150 ml. of hexane. In order to compensate for the electron donor functions of the trimethoxysilyl group, aditional ethylaluminum dichloride was added to the catalyst utilized in the control experiment (Example 7) which consisted of 0.5 mmol. of tungsten hexachloride, 0.5 mmol. of ethanol and 3 mmol. of ethylaluminum dichloride.

The following results were obtained:

| Example No. | EtAlCl₂ mmol. | Polymer g. | % of Theory |
| --- | --- | --- | --- |
| 7 | 3.0 | 0 | 0 |
| 8 | 8.0 | 3.0 | 4.2 |
| 9 | 10.5 | 2.1 | 3.0 |
| 10 | 13.0 | 21.6 | 31.6 |
| 11 | 15.5 | 29.9 | 42.6 |
| 12 | 18.0 | 23.2 | 38.8 |
| 13 | 20.5 | 11.6 | 19.4 |
| 14 | 23.0 | 9.1 | 15.2 |
| 15 | 33.0 | 5.2 | 7.3 |

These examples show that a cycloalkenyl trialkoxysilane can be utilized even when the electron donor function of only one of the three Si-O-C-linkages is compensated for by additional Lewis acid (Example 10), and further that the addition of more than 1.5 mole of lewis acid per mole of silane again drastically reduces the yield (Examples 13–15). The same results are obtained when using a cycloalkenyl dialkoxysilane, e.g., 3-(γ-diethoxymethylsilyl)-propylcyclooctene-(1).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What we claim is:

1. A process for preparing polymeric hydrocarbons having hydrolyzable silyl side groups non-terminally substituted along the polymer backbone, which comprises metathetically reacting
   a. a silylcycloolefin capable of being polymerized under ring opening and having at least one hydrolyzable silyl group substituted on the cycloolefin skeleton at a carbon atom other than the carbon atoms forming the olefinic bond; with at least one of
   b. a polymeric hydrocarbon having at least one unbranched double bond in the polymer backbone, or
   c. a cycloolefinic hydrocarbon capable of copolymerization under ring opening with said silylcycloolefin.

2. A process according to claim 1, wherein the reaction is conducted at a temperature between about −50° and + 80°C.

3. A process according to claim 1, wherein the hydrolyzable silyl group is a halogen atom.

4. A process according to claim 3, wherein the halogen atom is chlorine.

5. A process according to claim 1, wherein the hydrolyzable silyl group is an alkoxy, carboxy or a ketoxime group.

6. A process according to claim 5, conducted in the presence of sufficient Lewis acid to compensate for the electron donor function of the hydrolyzable group.

7. A process according to claim 6, wherein about 1–1.5 mol of Lewis acid is employed per mol of silicone.

8. A process according to claim 7, wherein the Lewis acid is a component of the metathetical catalyst.

9. A process according to claim 8, wherein an alkyl aluminum, alkyl aluminum halide or aluminum halide is employed as the Lewis acid.

10. A process according to claim 1, wherein 0.5–5 mol percent of silycycloolefin is employed per 1 mol of hydrocarbon.

11. A process according to claim 1, wherein 5–20 mol percent of silylcycloolefin is employed per 1 mol of hydrocarbon.

* * * * *